(12) United States Patent
Hwang et al.

(10) Patent No.: US 12,206,120 B2
(45) Date of Patent: Jan. 21, 2025

(54) BATTERY CASE FOR SECONDARY BATTERY AND METHOD FOR MANUFACTURING POUCH TYPE SECONDARY BATTERY

(71) Applicant: LG Energy Solution, Ltd., Seoul (KR)

(72) Inventors: Soo Ji Hwang, Daejeon (KR); Yong Su Choi, Daejeon (KR); Sang Hun Kim, Daejeon (KR); Hyung Kyun Yu, Daejeon (KR); Na Yoon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 450 days.

(21) Appl. No.: 17/627,940

(22) PCT Filed: Aug. 25, 2020

(86) PCT No.: PCT/KR2020/011319
§ 371 (c)(1),
(2) Date: Jan. 18, 2022

(87) PCT Pub. No.: WO2021/040380
PCT Pub. Date: Mar. 4, 2021

(65) Prior Publication Data
US 2022/0263166 A1 Aug. 18, 2022

(30) Foreign Application Priority Data
Aug. 27, 2019 (KR) ............... 10-2019-0105419

(51) Int. Cl.
*H01M 50/317* (2021.01)
*H01M 10/058* (2010.01)
(Continued)

(52) U.S. Cl.
CPC ....... *H01M 50/126* (2021.01); *H01M 10/058* (2013.01); *H01M 50/105* (2021.01); *H01M 50/317* (2021.01)

(58) Field of Classification Search
CPC ............. H01M 50/105; H01M 50/178; H01M 50/188; H01M 50/317; H01M 50/342;
(Continued)

(56) References Cited

U.S. PATENT DOCUMENTS 6,811,716 B1 11/2004 Stengaard et al.
2003/0232236 A1 12/2003 Mitchell et al.
(Continued)

FOREIGN PATENT DOCUMENTS

CN 103597631 A 2/2014
CN 205542919 U 8/2016
(Continued)

OTHER PUBLICATIONS

Extended European Search Report including Written Opinion for Application No. 20856376.7 dated Aug. 25, 2022, pp. 1-8.
(Continued)

*Primary Examiner* — Kevin E Yoon
(74) *Attorney, Agent, or Firm* — Lerner David LLP

(57) ABSTRACT

A battery case for a secondary battery according to an embodiment of the present invention can include a cup part having an accommodation space configured to accommodate an electrode assembly in which electrodes and separators are stacked, a sealing part extending to the outside of the cup part, and a gas discharge part which is attached to a hole formed to be punched in at least one of the cup part or the sealing part and through which a gas passes. The gas discharge part can include a melted layer comprising a thermoplastic resin that is melted when heat is applied, and a thermosetting layer laminated on one surface of the melted
(Continued)

layer and comprising a thermosetting resin that is not melted by heat.

16 Claims, 5 Drawing Sheets

(51) Int. Cl.
*H01M 50/105* (2021.01)
*H01M 50/126* (2021.01)

(58) Field of Classification Search
CPC . H01M 50/375; H01M 50/392; H01M 50/394
See application file for complete search history.

(56) References Cited

U.S. PATENT DOCUMENTS

| | | | |
|---|---|---|---|
| 2013/0071696 | A1 | 3/2013 | Kim et al. |
| 2013/0288104 | A1 | 10/2013 | Kang et al. |
| 2014/0120387 | A1 | 5/2014 | Kinuta et al. |
| 2015/0013151 | A1 | 1/2015 | Kang et al. |
| 2016/0118669 | A1 | 4/2016 | Ito et al. |
| 2017/0274416 | A1 | 9/2017 | Yeom |
| 2018/0241023 | A1 | 8/2018 | Lim |
| 2022/0116539 | A1 | 4/2022 | Wang |
| 2022/0263166 | A1 | 8/2022 | Hwang et al. |

FOREIGN PATENT DOCUMENTS

| | | | |
|---|---|---|---|
| CN | 205645893 U | 10/2016 | |
| CN | 107107096 A | 8/2017 | |
| EP | 4002568 A1 | 5/2022 | |
| JP | H0627534 A | 2/1994 | |
| JP | 2000-256915 A | 9/2000 | |
| JP | 2001-504555 A | 4/2001 | |
| JP | 2003331819 A | 11/2003 | |
| JP | 2004-043995 A | 2/2004 | |
| JP | 2007-214451 A | 8/2007 | |
| JP | 2008198664 A | 8/2008 | |
| JP | 2011233747 A | 11/2011 | |
| JP | 5447922 B2 | 3/2014 | |
| JP | 2014-082097 A | 5/2014 | |
| JP | 2015133208 A | 7/2015 | |
| JP | 2015195191 A | 11/2015 | |
| JP | 2018131604 A | 8/2018 | |
| JP | 2019067616 A | 4/2019 | |
| KR | 100956397 B1 | 5/2010 | |
| KR | 20130099892 A | 9/2013 | |
| KR | 101348366 B1 | 1/2014 | |
| KR | 101379490 B1 | 4/2014 | |
| KR | 20140120966 A | 10/2014 | |
| KR | 101472202 B1 | 12/2014 | |
| KR | 20150034498 A | 4/2015 | |
| KR | 20150061996 A * | 6/2015 | .............. H01M 2/02 |
| KR | 2016-0009584 A | 1/2016 | |
| KR | 101675012 B1 | 11/2016 | |
| KR | 20170011358 A | 2/2017 | |
| KR | 20170057297 A | 5/2017 | |
| KR | 20170068332 A * | 6/2017 | .......... H01M 10/052 |
| KR | 20190042215 A | 4/2019 | |
| WO | 2021004038 A1 | 1/2021 | |

OTHER PUBLICATIONS

International Search Report for PCT/KR2020/011319 dated Dec. 2, 2020. 3 pgs.
Third party observations for European Application 20856376.7 dated Dec. 21, 2023. 3 pages.
Search Report dated Aug. 29, 2023 from the Office Action for Chinese Application No. 202080051406.6 issued Aug. 31, 2023, 2 pages. [See p. 1, categorizing the cited references].

* cited by examiner

BATTERY CASE FOR SECONDARY BATTERY AND METHOD FOR MANUFACTURING POUCH TYPE SECONDARY BATTERY

CROSS-REFERENCE TO RELATED APPLICATION

The present application is a national phase entry under 35 U.S.C. § 371 of International Application No. PCT/KR2020/011319 filed Aug. 25, 2020, which claims the benefit of the priority of Korean Patent Application No. 10-2019-0105419, filed on Aug. 27, 2019, the disclosures of which are incorporated herein by reference in their entirety.

TECHNICAL FIELD

The present invention relates to a battery case for a secondary battery, a pouch type secondary battery, and a method for manufacturing the pouch type secondary battery, and more particularly, to a battery case for a secondary battery, which is capable of discharging an inner gas to the outside to adjust a pressure when an internal pressure of a pouch increases, a method for manufacturing a pouch type secondary battery.

BACKGROUND ART

In general, secondary batteries include nickel-cadmium batteries, nickel-hydrogen batteries, lithium-ion batteries, and lithium-ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

In the secondary battery, a gas may be generated by internal short-circuit, overcharging, overdischarging, or the like due to an external impact. In addition, when the secondary battery is stored at a high temperature, an electrochemical reaction between an electrolyte and an electrode active material is quickly promoted by the high temperature to generate a gas.

Here, the generated gas may allow the secondary battery to increase in internal pressure to cause problems such as weakening of bonding force between components, damage of a case of the secondary battery, an early operation of a protection circuit, deformation of an electrode, internal short-circuit, explosion, and the like. To prevent these phenomena, in the case of the can type secondary battery, a protection member such as a CID filter and a safety vent is provided. Thus, when the pressure within the case increases, electrical connection may be physically interrupted. However, in the case of the pouch type secondary battery according to the related art, the protection member is not sufficiently provided.

DISCLOSURE OF THE INVENTION

Technical Problem

An object of the present invention for solving the above problems is to provide a battery case for a secondary battery, which is capable of discharging an inner gas to the outside to adjust a pressure when an internal pressure of a pouch increases, a method for manufacturing a pouch type secondary battery.

The objects of the present invention are not limited to the aforementioned object, but other objects not described herein will be clearly understood by those skilled in the art from descriptions below.

Technical Solution

A battery case for a secondary battery according to an embodiment of the present invention for solving the above problem includes: a cup part having an accommodation space configured to accommodate an electrode assembly in which electrodes and separators are stacked; a sealing part extending to the outside of the cup part; and a gas discharge part which is attached to a hole formed to be punched in at least one of the cup part or the sealing part and through which a gas passes, wherein the gas discharge part includes: a melted layer including a thermoplastic resin that is melted when heat is applied; and a thermosetting layer laminated on one surface of the melted layer and including a thermosetting resin that is not melted by heat.

Also, the thermoplastic resin may include polyethylene (PE), polyethylene terephthalate (PET), polyimide (PI), polypropylene (PP), polystyrene (PS), nylon, acetate, PVC, or acrylic.

Also, the thermosetting resin may include melamine, urea, epoxy, or polyurethane.

Also, the gas discharge part may be formed on an outer surface of the melted layer and further include a waterproof layer having a hydrophobic property.

Also, the waterproof layer may be formed by distributing a plurality of fine protrusions on an outer surface thereof.

Also, the waterproof layer may include an oil or wax component.

Also, the oil may include at least one of fluorinated carbon oil, silicone oil, carbon-based oil, or fatty acid amide.

Also, the sealing part may include: an inner area adjacent to the cup part; and an outer area disposed outside the inner area to provide an edge of the sealing part and sealed to seal the cup part, wherein the hole may be formed in the inner area in the sealing part.

Also, the gas discharge part may be provided in plurality.

Also, the gas discharge part may include an adhesive between the melted layer and the thermosetting layer.

Also, the gas discharge part may be attached from the inside of the hole.

A pouch type secondary battery according to an embodiment of the present invention for solving the above problem includes: an electrode assembly formed by stacking electrodes and separators; and a battery case configured to accommodate the electrode assembly therein, wherein the battery case includes: a cup part having an accommodation space configured to accommodate the electrode assembly; a sealing part extending to the outside of the cup part; and a gas discharge part which is attached to a hole formed to be punched in at least one of the cup part or the sealing part and through which a gas passes, wherein the gas discharge part includes: a melted layer including a thermoplastic resin that is melted when heat is applied; and a thermosetting layer laminated on one surface of the melted layer and including a thermosetting resin that is not melted by heat.

A method for manufacturing a pouch type secondary battery according to an embodiment of the present invention for solving the above problem includes: a step of drawing a pouch film to form a cup part; a step of punching a hole in at least one of the cup part or a sealing part extending to the outside of the cup part; a step of attaching a gas discharge part, through which a gas passes, to the hole; a step of accommodating an electrode assembly, which is formed by stacking electrodes and separators, in an accommodation space provided in the cup part; and a step of thermally pressing the sealing part, wherein the gas discharge part includes: a melted layer including a thermoplastic resin that is melted when heat is applied; and a thermosetting layer laminated on one surface of the melted layer and including a thermosetting resin that is not melted by heat.

Also, the gas discharge part may be manufactured through the method for manufacturing the pouch type secondary battery, which includes: a step of preparing a film of the melted layer and a film of the thermosetting layer by using the thermoplastic resin and the thermosetting resin, respectively; a step of applying an adhesive between the film of the melted layer and the film of the thermosetting layer so that the film of the melted layer and the film of the thermosetting layer adhere to each other; and a step of drying and curing the adhesive.

Also, the gas discharge part is manufactured by performing: a step of preparing a film of the melted layer and a film of the thermosetting layer by using the thermoplastic resin and the thermosetting resin, respectively; a step of applying an adhesive between the film of the melted layer and the film of the thermosetting layer so that the film of the melted layer and the film of the thermosetting layer adhere to each other; and a step of drying and curing the adhesive.

Also, the gas discharge part is manufactured by performing: a step of preparing a film of the melted layer by using the thermoplastic resin; a step of applying a liquid thermosetting resin on one surface of the film of the melted layer; and a step of heating and curing the thermosetting resin.

Also, the gas discharge part is manufactured by performing: a step of supplying a liquid thermoplastic resin to a first extruder and supplying a liquid thermosetting resin to a second extruder; a step of allowing the first extruder and the second extruder to co-extrude the thermoplastic resin and the thermosetting resin onto a die, thereby preparing a composite film; and a step of cooling the composite film.

Also, the pouch film may include a sealant layer made of a polymer and disposed at the innermost layer, and in the step of attaching the gas discharge part, the melted layer is sealed by applying heat and a pressure to the sealant layer.

Particularities of other embodiments are included in the detailed description and drawings.

Advantageous Effects

According to the embodiments of the present invention, there are at least the following effects.

The hole may be punched in the battery case, and the gas discharge part through which the gas passes may be attached to the hole. Therefore, when the internal pressure of the secondary battery increases, the inner gas may be discharged to the outside to adjust the pressure.

In addition, the waterproof layer may be formed on the gas discharge part to prevent the external moisture from being permeated and prevent the inner electrolyte from leaking.

In addition, when the gas discharge part is attached to the hole, the gas discharge part may be prevented from being melted to be fused also to the sealing block.

The effects of the prevent invention are not limited by the aforementioned description, and thus, more varied effects are involved in this specification.

MODE FOR CARRYING OUT THE INVENTION

Figure 1:
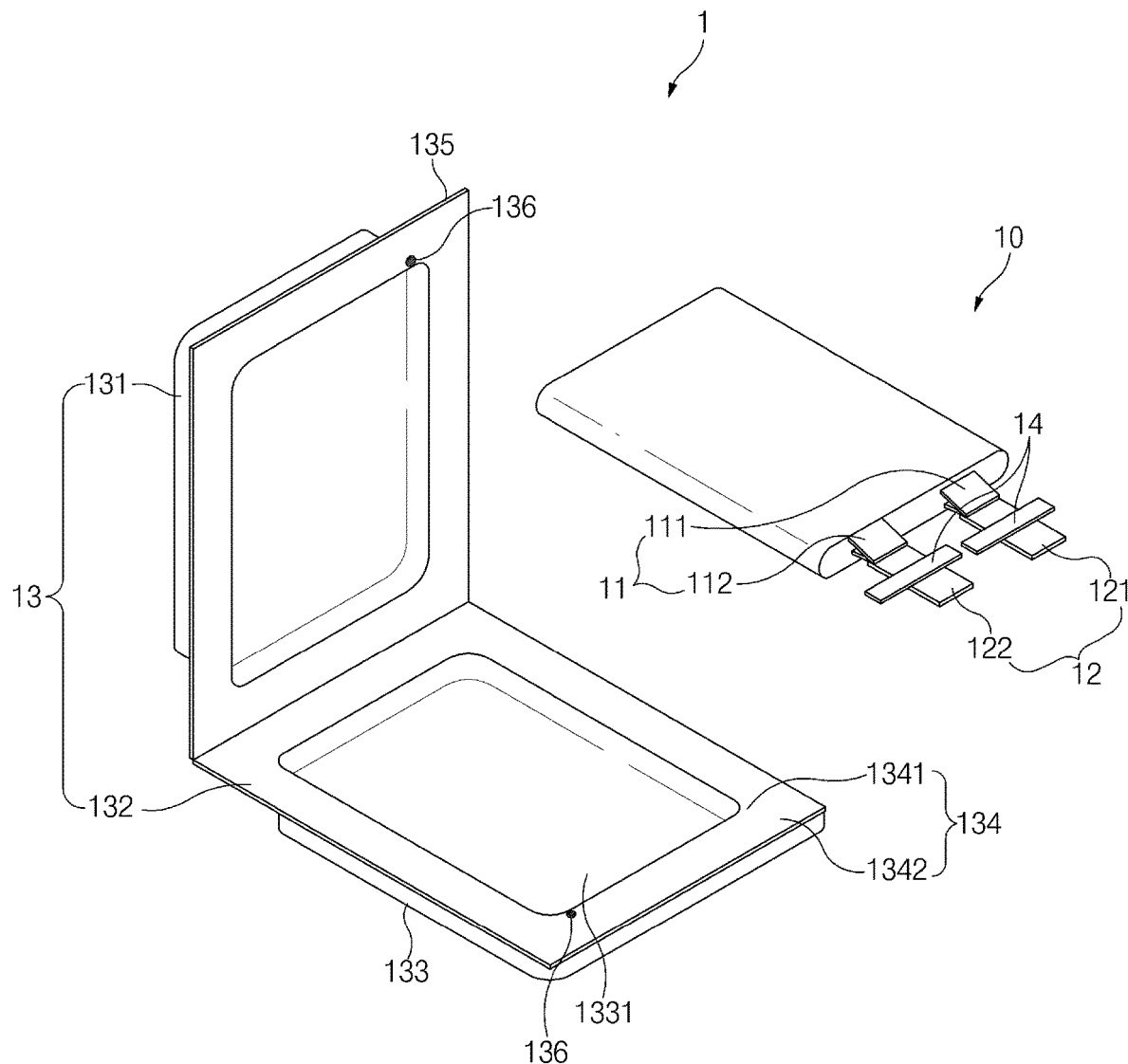
FIG. 1 is an assembly view of a pouch type secondary battery according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

FIG. 1 is an assembly view of a pouch type secondary battery 1 according to an embodiment of the present invention.

As illustrated in FIG. 1, the pouch type secondary battery 1 according to an embodiment of the present invention includes an electrode assembly 10, in which electrodes such as a positive electrode and a negative electrode and separators are stacked, and a pouch type battery case 13 accommodating the electrode assembly 10 therein.

To manufacture the pouch type secondary battery 1, first, slurry in which an electrode active material, a binder, and a plasticizer are mixed with each other is applied to a positive electrode collector and a negative electrode collector to manufacture electrodes such as a positive electrode and a negative electrode. The electrodes are stacked on both sides of a separator to manufacture the electrode assembly 10 having a predetermined shape. Then, the electrode assembly 10 is inserted into the battery case 13, and the battery case 13 is sealed after injecting an electrolyte therein.

Particularly, the electrode assembly 10 may be a stacked structure including two types of electrodes such as a positive electrode and a negative electrode and a separator disposed between the electrodes to insulate the electrodes from each other or disposed at a left or right side of one electrode. The stacked structure may have various shapes without being limited in shape. For example, the cathode and the anode, each of which has a predetermined standard, may be stacked with the separator therebetween, or the stacked structure may be wound in the form of a jelly roll. Each of the two types of electrodes, i.e., the positive electrode and the negative electrode have a structure in which active material slurry is applied to the electrode collector having a metal foil or metal mesh shape. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes the electrode tabs 11. The electrode tabs 11 are respectively connected to a positive electrode and a negative electrode of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, each of the electrode tabs 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. An insulation part 14 may be disposed to be limited within a sealing part 134, at which an upper case 131 and a lower case 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 includes a positive electrode lead 121 having one end connected to a positive electrode tab 111 to extend in a direction in which the positive electrode tab 111 protrudes and a negative electrode lead 122 having one end connected to a negative electrode tab 112 to extend in a direction in which the negative electrode tab 112 protrudes. On the other hand, as illustrated in FIG. 1, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the positive electrode lead 121 may be made of the same material as the cathode collector, i.e., an aluminum (Al) material, and the negative electrode lead 122 may be made of the same material as the anode collector, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material. Also, the battery case 13 accommodates the electrode assembly 10 so that a portion of the electrode lead 12, i.e., the terminal part is exposed and then is sealed. As illustrated in FIG. 1, the battery case 13 includes the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Here, as illustrated in FIG. 1, the cup part 133 having the accommodation space 1331 may be formed in the upper case 131 to accommodate the electrode assembly 10 in the upper portion. However, the present invention is not limited thereto. For example, a cup part 133 may be formed in only the lower case 132, i.e., may be formed in various positions. Also, as illustrated in FIG. 1, one side of the upper case 131 and one side of the lower case 132 may be connected to each other. However, the present invention is not limited thereto. For example, the upper case 131 and the lower case 132 may be separately manufactured to be separated from each other.

The battery case 13 includes a gas discharge part 136 through which a gas passes. The gas discharge part 136 is attached to a hole 137 (see FIG. 5), which is formed to be punched in at least one of the cup part 133 or the sealing part 134.

The hole 137 is formed in at least one of the upper case 131 or the lower case 132. That is, only one hole 137 may be formed, but a plurality of holes 137 may be formed. Also, as illustrated in FIG. 1, the sealing part 134 extending to the outside of the cup part 133 includes an inner area 1341 adjacent to the cup part 133 and an outer area 1342 disposed outside the inner area 1341 to provide an edge of the sealing part 134 and sealed to seal the cup part 133. Here, it is preferable that the hole 137 is formed in the inner area 1341 rather than the outer area 1342 in the sealing part 134. Also, when sealing the sealing part 134 later, it is preferable to seal only the outer area 1342 without sealing the inner area 1341 in which the hole 137 is disposed. Thus, the two sealing parts 134 of the upper and lower cases 131 and 132 may be normally in contact with each other to close the hole 137, thereby preventing external moisture from being permeated and preventing the internal electrolyte from leaking. Also, when a large amount of gas is generated inside the secondary battery 1, a volume of the secondary battery 1 is expanded, and thus, the inner areas 1341 of the two sealing parts 134 that are in contact with each other are spaced apart from each other. Then, the hole 137 is opened to discharge the gas to the outside through the gas discharge part 136. However, the present invention is not limited thereto, and the hole 137 may be formed at various positions as long as the gas is easily discharged, such as formed in one surface of the cup part 133.

The gas discharge part 136 is attached to the hole 137 to allow a gas to easily pass therethrough. Here, it is preferable that the gas discharge part 136 is sealed by applying heat and a pressure through a sealing block 2 (see FIG. 5) to a partial area of the battery case 13 in which the hole 137 is formed. Here, according to an embodiment of the present invention, it is possible to prevent the gas discharge part 136 from being melted and fused also to the sealing block 2. The gas discharge part 136 will be described below in detail.

When an electrode lead 12 is connected to the electrode tab 11 of the electrode assembly 10, and the insulation part 14 is provided on a portion of the electrode lead 12, the electrode assembly 10 may be accommodated in the accommodation space 1331 provided in the cup part 133 of the lower case 132, and the upper case 131 may cover the accommodation space from the upper side. Also, the electrolyte is injected, and the sealing part 134 formed on edges of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte.

Figure 2:
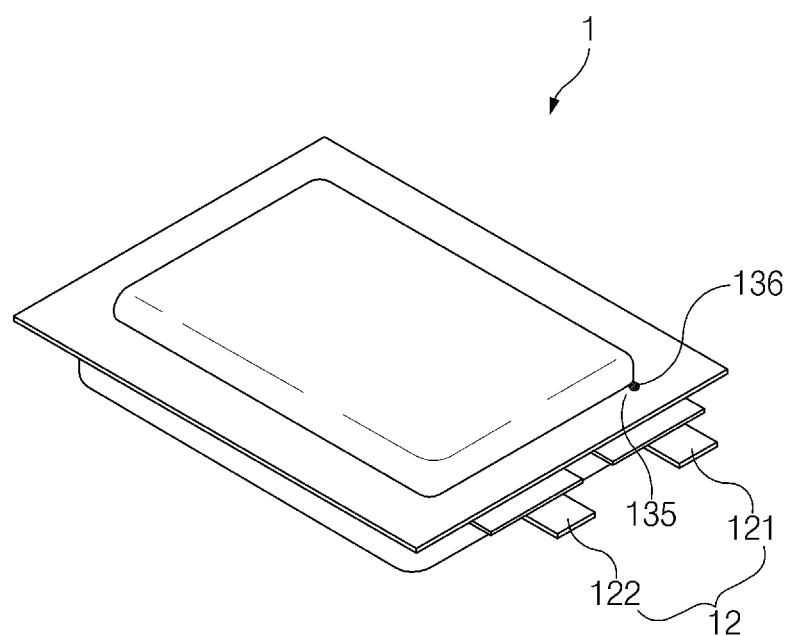
FIG. 2 is a perspective view of the pouch type secondary battery of FIG. 1.

FIG. 2 is a perspective view of the pouch type secondary battery 1 according to an embodiment of the present invention.

According to an embodiment of the present invention, a hole 137 is punched in a battery case 13, and a gas discharge part 136 through which a gas passes is attached to the hole 137. Thus, when an internal pressure of the secondary battery 1 increases, an inner gas may be discharged to the outside to adjust a pressure. Also, a waterproof layer 1363 may be formed on the gas discharge part 136 to prevent external moisture from being permeated and prevent an inner electrolyte from leaking. Also, when the gas discharge part 136 is attached to the hole 137, it is possible to prevent the gas discharge part 136 from being melted and fused also to the sealing block 2.

For this, a method for manufacturing a pouch type secondary battery 1 according to an embodiment of the present invention includes: a step of drawing a pouch film 135 to form a cup part 133; a step of punching a hole 137 in at least one of the cup part 133 or a sealing part 134 extending to the outside of the cup part 133; a step of attaching a gas discharge part, through which a gas passes, to the hole 137; a step of accommodating an electrode assembly 10, which is formed by stacking electrodes and separators, in an accommodation space 1331 provided in the cup part 133; and a step of thermally pressing the sealing part 134. The gas discharge part 136 includes: a melted layer 1361 including a thermoplastic resin that is melted when heat is applied; and a thermosetting layer 1362 which is laminated on one surface of the melted layer 1361 and includes a thermosetting resin that is not melted by heat. Thus, the pouch type secondary battery 1 may be manufactured as illustrated in FIG. 2.

Also, a pouch type secondary battery 1, which is manufactured as the above-described method, according to an embodiment of the present invention includes: an electrode assembly 10 formed by stacking electrodes and separators; and a battery case 13 configured to accommodate the electrode assembly 10 therein. The battery case 13 includes: a cup part 133 having an accommodation space configured to accommodate the electrode assembly 10; a sealing part 134 extending to the outside of the cup part 133; and a gas discharge part 136 which is attached to a hole 137 formed to be punched in at least one of the cup part 133 or the sealing part 134 and through which a gas passes. The gas discharge part 136 includes: a melted layer 1361 including a thermoplastic resin that is melted when heat is applied; and a thermosetting layer 1362 which is laminated on one surface of the melted layer 1361 and includes a thermosetting resin that is not melted by heat.

Figure 3:
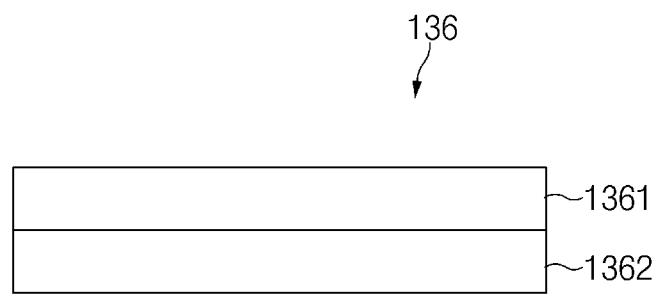
FIG. 3 is a cross-sectional view of a gas discharge part according to an embodiment of the present invention.

FIG. 3 is a cross-sectional view of the gas discharge part 136 according to an embodiment of the present invention.

The gas discharge part 136 is attached to the hole 137, which is formed to be punched in at least one of the cup part 133 or the sealing part 134, so that the gas passes therethrough. As illustrated in FIG. 3, the gas discharge part 136 includes a melted layer 1361 including a thermoplastic resin that is melted when heat is applied and a thermosetting layer 1362 laminated on the other surface of the melted layer 1361 and including a thermosetting resin that is not melted by heat.

It is preferable that the melted layer 1361 is formed as a semipermeable membrane, through which the gas easily passes, but a liquid such as water, an electrolyte, and the like is not easy to pass therethrough. In order to have the semipermeable property as described above, pores may be distributed and formed in the melted layer 1361. Also, the melted layer 1361 includes the thermoplastic resin and is melted when the heat is applied.

The thermoplastic resin is a resin that is melted when the heat is applied in a cured state, has flexibility, is plastic-deformable, and is cured again when cooled. Also, since this phenomenon occurs reversibly, it may be repeatedly melted and cured. The thermoplastic resin includes polyethylene (PE), polyethylene terephthalate (PET), polyimide (PI), polypropylene (PP), polystyrene (PS), nylon, acetate, PVC, or acrylic. Particularly, it is most preferable that the melted layer 1361 according to an embodiment of the present invention is polypropylene (PP) having the most excellent in ease of manufacturing process and fusion property.

Like the melted layer 1361, it is preferable that the thermosetting layer 1362 is formed as a semipermeable membrane through which a gas easily passes, but a liquid such as water, an electrolyte, and the like is not easy to pass therethrough. In order to have the semipermeable property as described above, pores may also be distributed and formed in the thermosetting layer 1362. Also, the thermosetting layer 1362 may be formed by being laminated on one surface of the melted layer 1361, include a thermosetting resin, and may not be melted by heat even when the heat is applied.

Unlike the thermoplastic resin, the thermosetting resin is a resin that is not melted and deformed again even if the heat is applied again when cured once and thus maintained in the cured state as ever. The thermosetting resin may be burned, decomposed, or evaporated when the heat is applied at a predetermined temperature or more according to types thereof. The thermosetting resin includes melamine, urea, epoxy, or polyurethane. Particularly, it is most preferable that the thermosetting layer 1362 according to an embodiment of the present invention is epoxy or polyurethane.

In order to manufacture the gas discharge part 136, a dry lamination method may be used. Particularly, a film of the melted layer 1361 is prepared using the thermoplastic resin, and a film of the thermosetting layer 1362 is prepared using the thermosetting resin. Also, an adhesive is applied between the film of the melted layer 1361 and the film of the thermosetting layer 1362 so as to be bonded to each other. Thereafter, the adhesive may be dried and cured to manufacture the gas discharge part 136. The gas discharge part 136 may include an adhesive between the melted layer 1361 and the thermosetting layer 1362.

Alternatively, in order to manufacture the gas discharge part 136, a heat lamination method may be used. Particularly, a film of the melted layer 1361 is prepared using the thermoplastic resin. Also, a liquid thermosetting resin may be applied to one surface of the film of the melted layer 1361, and the thermosetting resin may be heated and cured to manufacture the gas discharge part 136.

Alternatively, in order to manufacture the gas discharge part 136, a co-extrusion lamination method may be used. Particularly, the liquid thermoplastic resin is supplied to a first extruder, and the liquid thermosetting resin is supplied to a second extruder. Then, the first extruder and the second extruder co-extrude the thermoplastic resin and the thermosetting resin onto a die. Then, a composite film in which the thermoplastic resin and the thermosetting resin are laminated together is prepared. Also, the composite film may be cooled to manufacture the gas discharge part 136.

Figure 4:
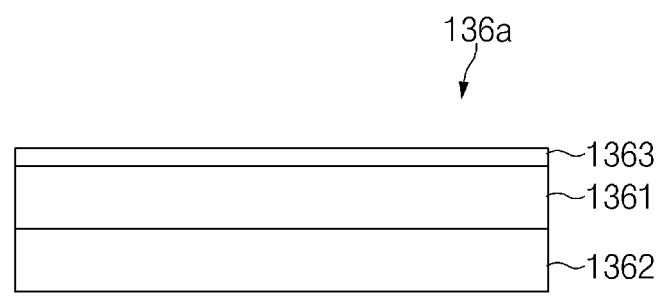
FIG. 4 is a cross-sectional view illustrating a gas discharge part according to another embodiment of the present invention.

FIG. 4 is a cross-sectional view illustrating a gas discharge part according to another embodiment of the present invention.

According to an embodiment of the present invention, a separate cover for opening and closing the hole formed in the battery case 13 is not provided. If the cover exists, it is not easy to close the hole 137 again after the cover opens the hole 137. In addition, in order to solve this problem, a separate hinge has to be installed so that the cover opens and closes the hole 137, and thus, a structure may be complicated, and durability may be reduced. However, if the cover does not exist, a small amount of moisture may be permeated from the outside through the thermosetting layer 1362 even if it is difficult for liquid to pass through the thermosetting layer 1362.

Thus, according to another embodiment of the present invention, as illustrated in FIG. 4, the gas discharge part 136a is formed on an outer surface of the melted layer 1136 and may further include a waterproof layer 1363 having a hydrophobic property. Here, the outer surface of the gas discharge part 136a refers to a surface formed outside the secondary battery 1, i.e., in a direction opposite to the electrode assembly 10 when the secondary battery 1 is manufactured.

In the waterproof layer 1363, a plurality of fine protrusions may be distributed on an outer surface thereof. Thus, the plurality of fine protrusions may have the hydrophobic property to prevent moisture from being condensed on the outer surface of the waterproof layer 1363. Here, the outer surface of the waterproof layer 1363 refers to a surface opposite to the surface bonded to the gas emission layer 1362. A diameter of each of the fine projections may be 50 nm to 10 µm, preferably 100 nm to 1 µm. This is because if the diameter of each of the fine protrusions is excessively small, the hydrophobic property may be deteriorated, and if the diameter is excessively large, fusing force between the gas discharge part 136a and the pouch film 135 may be deteriorated later.

To distribute the fine protrusions, fine particles are contained in the waterproof layer 1363, and the fine particles may include at least one of silica particles, carbon nanotubes (CNT), or alumina particles. However, the waterproof layer 1363 has to have the hydrophobic property, but the silica particles have a hydrophilic property. Therefore, if the fine particles contain silica particles, it is preferable to contain only a very small amount of about 0.1 wt % to 2 wt %.

Alternatively, the waterproof layer 1363 may have an oil or wax component. The oil or wax may have the hydrophobic property because of having a lipophilic property that does not intend to be mixed with moisture. Here, the oil may include at least one of fluorinated carbon oil, silicone oil, carbon-based oil, or fatty acid amide. As described above, the waterproof layer 1363 may be formed to more effectively prevent external moisture from being permeated.

Figure 5:
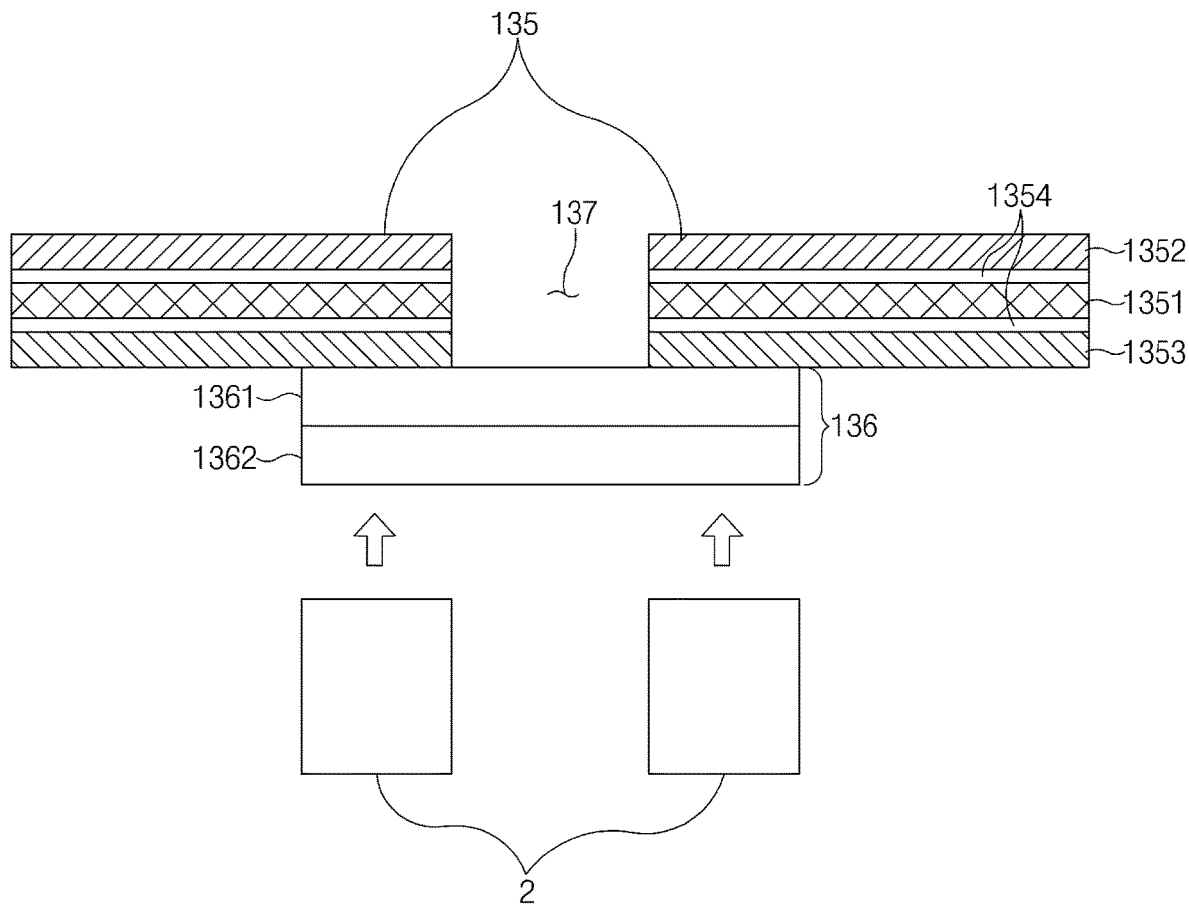
FIG. 5 is a cross-sectional view of the gas discharge part of FIG. 3 attached to a hole according to an embodiment of the present invention.

FIG. 5 is a cross-sectional view illustrating a configuration in which the gas discharge part is attached to a hole according to an embodiment of the present invention.

A battery case 13 for a secondary battery 1 according to an embodiment of the present invention includes: a cup part 133 having an accommodation space 1331 configured to accommodate an electrode assembly 10 in which electrodes and separators are stacked; a sealing part 134 extending to the outside of the cup part 133; and a gas discharge part 136 which is attached to a hole 137 formed to be punched in at least one of the cup part 133 or the sealing part 134 and through which a gas passes. The gas discharge part 136 includes a melted layer 1361 including a thermoplastic resin that is melted when heat is applied and a thermosetting layer 1362 laminated on one surface of the melted layer 1361 and including a thermosetting resin that is not melted by heat.

In order to manufacture the battery case 13, first, the pouch film 135 is drawn and stretched to form a cup part 133. As illustrated in FIG. 5, the pouch film 135 includes a gas barrier layer 1351, a surface protection layer 1352, and a sealant layer 1353.

The gas barrier layer 1351 may secure mechanical strength of the battery case 13, block introduction and discharge of a gas or moisture outside the secondary battery 1, and prevent the electrolyte from leaking. In general, the gas barrier layer 1351 includes a metal. Particularly, it is preferable that aluminum (Al) foil is mainly used for the gas barrier layer 2351. Aluminum may secure the mechanical strength having a predetermined level or more, but be light in weight. Thus, aluminum may secure complement and heat dissipation for electrochemical properties due to the electrode assembly 10 and the electrolyte. However, the present invention is not limited thereto. For example, the gas barrier layer 1351 may be made of various materials. For example, the gas barrier layer 1351 may be made of one or more materials selected from the group consisting of Fe, C, Cr, Mn, Ni and Al. Here, the gas barrier layer 1351 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

The surface protection layer 1352 is made of a polymer and disposed at the outermost layer to protect the secondary battery 1 against external friction and collision and also electrically insulates the electrode assembly 10 from the outside. Here, the outermost layer refers to a layer disposed farthest from the gas barrier layer 1351 in a direction opposite to the direction in which the electrode assembly 10 is disposed with respect to the gas barrier layer 1351. The polymer forming the surface protection layer 1352 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, it is preferable that a polymer such as a nylon resin or polyethylene terephthalate (PET) having abrasion resistance and heat resistance is used mainly. Also, the surface protection layer 1352 may have a single layer structure made of one material or a composite layer structure in which two or more materials are respectively formed as layers.

The sealant layer 1353 is made of a polymer and disposed at the innermost layer to directly contact the electrode assembly 10. Here, the innermost layer refers to a layer disposed farthest from the gas barrier layer 1351 in the direction in which the electrode assembly 10 is disposed. Accordingly, the gas barrier layer 1351 is stacked between the surface protection layer 1352 and the sealant layer 1353, as illustrated in FIG. 5. Since the sealant layer 1353 directly contacts the electrode assembly 10, the sealant layer 23 may have to have insulating properties. Also, since the sealant layer 23 contacts the electrolyte, the sealant layer 23 may have to have corrosion resistance. Also, since the inside of the battery case 13 is completely sealed to prevent materials from moving between the inside and outside of the battery case 13, high sealability has to be realized. That is, the sealing part 134 in which the sealant layers 1353 are bonded to each other should have superior bonding strength. In general, the polymer forming the sealant layer 1353 may include one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, it is preferable that a polyolefin-based resin such as polypropylene (PP) or polyethylene (PE) is used for the sealant layer 23. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1353. Furthermore, the sealant layer 23 may be made of a cated polypropylene or a polypropylene-butylene-ethylene terpolymer. Also, the sealant layer 1353 may have a single layer structure made of one material or a composite layer structure in which two or more materials are respectively formed as layers.

An adhesive layer 1354 may be further formed between the gas barrier layer 1351, the surface protection layer 1352, and the sealant layer 1353 to bond the gas barrier layer 1351, the surface protection layer 1352, and the sealant layer 1353.

When the pouch film 135 having the stacked structure as described above is drawn using a punch, a portion of the pouch film 135 is stretched to form a cup part 133 including an accommodation space 1331 having a bag shape. Also, a hole 137 is punched in at least one of the cup part 133 or the sealing part 134.

When the hole 137 is punched, as illustrated in FIG. 5, the gas discharge part 136 through which the prepared gas passes may be attached to the hole 137 from the inside. Only one hole 137 may be formed, but a plurality of holes 137 may be formed. Accordingly, only one hole 137 may be formed in the gas discharge part 136, but a plurality of holes 137 may be formed in the gas discharge part 136.

In order to easily apply the heat and pressure to the gas discharge part 136, the outer surface of the gas discharge part 136 is pressed to the sealing block 2 in a state in which one surface of the gas discharge part 136 is in contact with a partial area of the battery case 13. However, if the gas discharge part 136 does not include the thermosetting layer 1362, when the sealing block 2 applies the heat and pressure to the other surface of the gas discharge part 136, the other surface of the gas discharge part 136 may be melted together and thus be fused to the sealing block 2. However, according to an embodiment of the present invention, the gas discharge part 136 may include the thermosetting layer 1362 to prevent the fusion with the sealing block 2. Here, the gas discharge part 136 may be attached from the outside of the hole 137, but as illustrated in FIG. 5, it is more preferable to be attached from the inside of the hole 137.

Particularly, as illustrated in FIG. 5, if the gas discharge part 136 is attached from the inside of the hole 137, one surface of the gas discharge part 136, in particular, the melted layer 1361 may be in contact with a partial area of the sealant layer 1353 in the battery case in which the hole 137 is formed. Also, the sealing block 2 may be in contact with the other surface of the gas discharge part 136, in particular, the thermosetting layer 1362 to apply the heat and pressure to the gas discharge part 136. Here, it is preferable that the sealing block 2 applies the heat and pressure to an area corresponding to an area on which the gas discharge part 136 is in contact with the battery case 13. As a result, the melted layer 1361 of the gas discharge part 136 and the sealant layer 1353 of the pouch film 135, which are in contact with each other, are fused by the heat and pressure of the sealing block 2. Also, since the thermosetting layer 1362 is not melted, the thermosetting layer 1362 of the gas discharge part 136 and the sealing block 2, which are in contact with each other, may be prevented from being fused to each other.

The melted layer 1361 and the thermosetting layer 1362 may have the same thickness, but may have thicknesses different from each other. Particularly, the thickness of the melted layer 1361 is preferably 40% to 70% of the thickness of the gas discharge part 136. If the thickness of the melted layer 1361 is less than 40%, there is a problem that fusion force between the melted layer 1361 and the sealant layer 1353 is deteriorated, and if the thickness of the melted layer 1361 is greater than 70%, the thermosetting layer 1362 is excessively thin to cause a problem in sealing processability.

Also, when the electrode assembly 10 is accommodated in the accommodation space 1331, the electrolyte is injected. Thereafter, when the upper case 131 and the lower case 132 may contact each other, and thermal compression is applied to the sealing part 134, the sealant layers 1353 may be bonded to each other to seal the battery case 13. Thus, the secondary battery 1 according to an embodiment of the present invention may be manufactured.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A battery case for a secondary battery, comprising:
a cup part having an accommodation space configured to accommodate an electrode assembly, the electrode assembly including electrodes and separators;
a sealing part extending to the outside of the cup part; and
a gas discharge part which is attached to a hole, the hole formed through at least one of the cup part or the sealing part, the hole configured to allow a gas to pass therethrough,
wherein the gas discharge part comprises:
a melted layer comprising a heat melted thermoplastic resin; and
a thermosetting layer laminated on one surface of the melted layer and comprising a thermosetting resin, wherein the sealing part comprises: an inner area adjacent to the cup part; and an outer area disposed outside the inner area to provide an edge of the sealing part, the outer area configured to form a seal to seal the cup part, wherein the hole is formed in the inner area of the sealing part.

2. The battery case of claim 1, wherein the thermoplastic resin comprises polyethylene (PE), polyethylene terephthalate (PET), polyimide (PI), polypropylene (PP), polystyrene (PS), nylon, acetate, PVC, or acrylic.

3. The battery case of claim 1, wherein the thermosetting resin comprises melamine, urea, epoxy, or polyurethane.

4. The battery case of claim 1, wherein the gas discharge part is formed on an outer surface of the melted layer and further comprises a waterproof layer, the waterproof layer being hydrophobic.

5. The battery case of claim 4, wherein the waterproof layer is formed by distributing a plurality of protrusions on an outer surface thereof.

6. The battery case of claim 4, wherein the waterproof layer comprises an oil or wax component.

7. The battery case of claim 6, wherein the oil comprises at least one of fluorinated carbon oil, silicone oil, carbon-based oil, or fatty acid amide.

8. The battery case of claim 1, wherein the battery case includes multiple gas discharge parts.

9. The battery case of claim 1, wherein the gas discharge part comprises an adhesive between the melted layer and the thermosetting layer.

10. The battery case of claim 1, wherein the gas discharge part is adjacent an opening of the hole, the opening located in the cup part or the sealing part.

11. A pouch type secondary battery comprising:
an electrode assembly including electrodes and separators; and
a battery case configured to accommodate the electrode assembly therein,
wherein the battery case comprises:
a cup part having an accommodation space configured to accommodate the electrode assembly;
a sealing part extending to the outside of the cup part; and
a gas discharge part which is attached to a hole, the hole formed through at least one of the cup part or the sealing part, the hole configured to allow a gas to pass therethrough,
wherein the gas discharge part comprises:
a melted layer comprising a heat melted thermoplastic resin; and
a thermosetting layer laminated on one surface of the melted layer and comprising a thermosetting resin that is not melted by heat, wherein the sealing part comprises: an inner area adjacent to the cup part; and an outer area disposed outside the inner area to provide an edge of the sealing part, the outer area configured to form a seal to seal the cup part, wherein the hole is formed in the inner area of the sealing part.

12. A method for manufacturing a pouch type secondary battery, the method comprising:
drawing a pouch film to form a cup part;
punching a hole in at least one of the cup part or a sealing part extending to the outside of the cup part;
attaching a gas discharge part to the hole, the gas discharge part configured to allow a gas to pass therethrough;
placing an electrode assembly in an accommodation space provided in the cup part, the electrode assembly including electrodes and separators; and
thermally pressing the sealing part,
wherein the gas discharge part includes
a melted layer of a heat melted thermoplastic resin and
a thermosetting layer laminated on one surface of the melted layer, the thermosetting layer including a thermosetting resin that is not melted by heat, wherein the sealing part comprises: an inner area adjacent to the cup part; and an outer area disposed outside the inner area to provide an edge of the sealing part, the outer area configured to form a seal to seal the cup part, wherein the hole is formed in the inner area of the sealing part.

13. The method of claim 12, wherein the gas discharge part is manufactured by:
preparing a film of the melted layer and a film of the thermosetting layer by using the thermoplastic resin and the thermosetting resin, respectively;
applying an adhesive between the film of the melted layer and the film of the thermosetting layer so that the film of the melted layer and the film of the thermosetting layer adhere to each other; and
drying and curing the adhesive.

14. The method of claim 12, wherein the gas discharge part is manufactured by:
preparing a film of the melted layer by using the thermoplastic resin;
applying a liquid thermosetting resin on one surface of the film of the melted layer; and
heating and curing the thermosetting resin.

15. The method of claim 12, wherein the gas discharge part is manufactured by:
providing a liquid thermoplastic resin to a first extruder and providing a liquid thermosetting resin to a second extruder;
preparing a composite film by allowing the first extruder and the second extruder to co-extrude the thermoplastic resin and the thermosetting resin onto a die; and
cooling the composite film.

16. The method of claim 12, wherein the pouch film comprises a sealant layer made of a polymer and disposed as an innermost layer of the pouch film, and
the step of attaching the gas discharge part to the hole, includes the step of attaching the melted layer to the sealant layer by applying heat and pressure.

* * * * *